United States Patent [19]

Carlson

[11] 4,040,770
[45] Aug. 9, 1977

[54] TRANSITION REINFORCEMENT OF COMPOSITE BLADE DOVETAILS

[75] Inventor: Robert G. Carlson, Greenhills, Ohio

[73] Assignee: General Electric Company, Cincinnati, Ohio

[21] Appl. No.: 643,497

[22] Filed: Dec. 22, 1975

[51] Int. Cl.$^2$ .............................................. F01D 5/28
[52] U.S. Cl. .................... 416/230; 416/241 A; 244/123; 428/156; 428/172; 428/212; 428/256; 428/294; 428/366; 428/367; 428/418; 428/608
[58] Field of Search ............... 428/156, 157, 418, 457, 428/366, 367, 256, 255, 402, 294, 172, 212; 416/229 R, 230, 241 A, 241 B; 29/156.8 R, 156.8 B, 156.8 P, 156.8 H, 156.8 T; 244/123; 156/293, 304, 309, 250, 254, 256, 257

[56] References Cited

U.S. PATENT DOCUMENTS

| | | | |
|---|---|---|---|
| 3,317,988 | 5/1967 | Endres | 29/156.8 B |
| 3,660,882 | 5/1972 | Widowitz et al. | 29/156.8 P |
| 3,752,600 | 8/1973 | Walsh et al. | 416/230 |
| 3,809,601 | 5/1974 | Fletcher | 428/157 |

*Primary Examiner*—George F. Lesmes
*Assistant Examiner*—Stanley S. Silverman
*Attorney, Agent, or Firm*—Robert C. Lampe, Jr.; Derek P. Lawrence

[57] ABSTRACT

The composite filament laminates of a composite blade are splayed at the root thereof to receive metallic inserts therebetween. A transition material having a modulus of elasticity greater than that of the inserts and less than that of the laminates is bonded therebetween to more uniformly distribute the blade loadings into the root region.

5 Claims, 4 Drawing Figures

TRANSITION REINFORCEMENT OF COMPOSITE BLADE DOVETAILS

BACKGROUND OF THE INVENTION

This invention relates to composite blades for use in fluid flow machines and, more particularly, to increasing the strength of composite blade dovetails.

For many years attempts have been made to replace the relatively heavy, homogeneous blades and vanes of fluid flow machines such as gas turbine engine compressors with lighter composite materials. The primary effort in this direction has been toward the use of high-strength, elongated filaments composited in a lightweight matrix. Early work involved glass fibers, and more recent efforts have been directed toward the utilization of boron, graphite and other synthetic filaments. These later materials have extemely high strength characteristics as well as high moduli of elasticity which contribute to the necessary stiffness of the compressor blades and vanes.

Many problems have confronted the efforts to utilize these filaments, particularly in adapting their unidirectional strength characteristics to a multidirectional stress field. To a large extent, these problems have been overcome and composite blades have been demonstrated with performance characteristics, in many areas, equal to or better than their homogeneous metal counterparts, in addition to providing the expected and significant weight reduction.

However, at least one difficult problem remains to be solved: that being the design of a suitable connection capable of transmitting the airfoil gas, centrifugal and impact loads to a rotatable hub or disc. Compressor blade dovetail attachments presently represent the most expeditious and reliable method of incorporating the airfoils into a rotatable hub. For composites, this creates difficulty in that composite filament structures are least effective at fiber transitions or edges. Due to the difference in geometry between the airfoil portion of a blade and its dovetail, it becomes necessary to splay the individual filament laminates to shape the dovetail, and fill the voids therebetween with a filler material to provide a dense, load-carrying structure. Typically, the filler material comprises solid metallic inserts formed of titanium alloys, for example. This structure has proven ineffective for several reasons, not the least of which being the difficulty of obtaining an adequate bond between the metallic inserts and the metallic composite material (i.e., boron filaments disposed in an aluminum matrix) during the diffusion bonding process.

The very nature of composite materials is that they exhibit anisotropy such that the filament laminates do not conform to the shape of the inserts during the blade forming/bonding process. Poor conformance results in poor bonding. As the bonding pressure is increased, the inability of the metallic inserts and the boronfilaments to deform as readily as the metallic matrix at the bonding temperature causes the boron filaments to be misaligned, crushed and fractured, thereby weakening the dovetail load-carrying capability. Furthermore, increasing bonding temperature produces high thermal residual stresses because of the different thermal expansion coefficients of the constituent materials.

Whereas the foregoing deficiencies relate to interlaminate inserts, the same may be said of dovetail outserts, those metallic sheaths disposed at least partially around the dovetail to provide filament laminate protection at the dovetail/hub slot interface and which effect a more uniform load transfer from the disc to the airfoil.

Thus, it becomes necessary to overcome the anisotropic behavior of the composite material and to provide for a more gradual transition between the composite materials and the homogeneous metallic inserts in order to have the dovetail and the slots remain a viable means of attaching a composite blade to a rotatable hub.

SUMMARY OF THE INVENTION

Accordingly, it is a primary object of the present invention to provide a composite blade dovetail having improved load-bearing capability.

It is another object of the present invention to provide a splayed composite article with improved interlaminate inserts to improve the loadcarrying capability thereof.

These and other objects and advantages will be more clearly understood from the following detailed description, the drawings and specific examples, all of which are intended to be typical of, rather than in any way limiting to, the scope of the present invention.

Briefly stated, the above objectives are accomplished in a blade formed of bonded filament laminates splayed along their length to receive a homogeneous metallic insert therebetween. The improvement comprises a transition, or gradient, material bonded between the interface of the filament laminates and the homogeneous metallic material. In particular, the transition material possesses a modulus of elasticity greater than that of the homogeneous metallic insert material and less than that of the filament laminate. In this manner, when subjected to loading, the transition material allows for a more uniform distribution of the load and, upon heating, the transition material develops lower thermal stresses at the transition material interfaces. Additionally, an intermediate transition material having a more pliable characteristic permits a better dovetail bond with little or no filament misalignment or fragmentation. In the preferred embodiment, the transition material comprises a wire mesh embedded in the same matrix material comprising the filament laminate. The transition material may extend radially, between the filament plies, from the airfoil portion of the blade and into the splayed dovetail portion where it provides a softer, more pliable transition between the splayed laminates and the homogeneous metallic inserts.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings, in which:

DESCRIPTION OF THE PREFERRED EMBODIMENT

Figure 1:
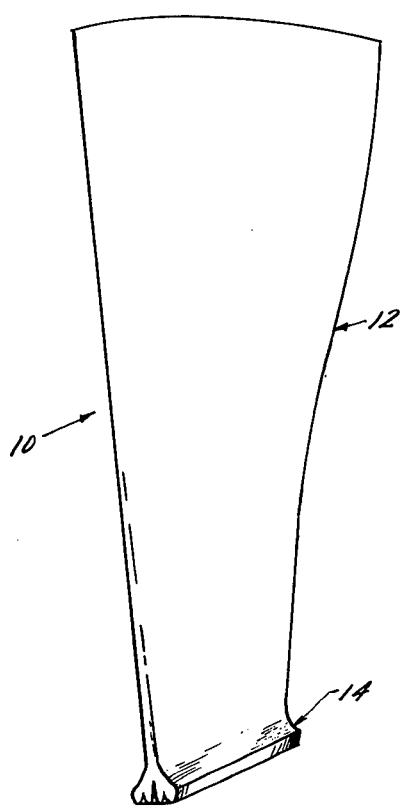
FIG. 1 is a perspective view of a gas turbine engine composite compressor blade embodying the present invention.

Referring to the drawings wherein like numerals correspond to like elements throughout, attention is first directed to FIG. 1 wherein a composite blade 10 for use in a fluid-flow machine and constructed according to the present invention is illustrated. While not so limiting, the blade 10 is adapted for use in axial flow gas turbine engine compressors and fans. It will become apparent to those skilled in the art that the present invention offers an improvement for many bladed structures and that rotor blade 10 is merely meant to be illustrative of one such application. Accordingly, rotor blade 10 is shown to comprise an airfoil portion 12, generally of radially variant camber and stagger, and a dovetail tang 14 which enables the blade to be mounted on and retained by a rotatable disc or hub in a conventional manner. A typical flow path defining platform, not shown, could be mounted between the airfoil 12 and the dovetail 14 portions of the blade.

The major portion, or primary structure, of the blade comprises laminates of elongated filaments having high strength and high modulus of elasticity embedded in a lightweight matrix. In one embodiment involving predominantly metallic material, the blade would comprise bonded boron filament laminates in an aluminum or aluminum alloy matrix. Also, it is anticipated that the structure could comprise any nonmetallic system including graphite filaments in an epoxy resin. Further, it is understood that the present invention anticipates the use of any fiber embedded in any binder, such as an organic resin, for its structure.

Figure 2:
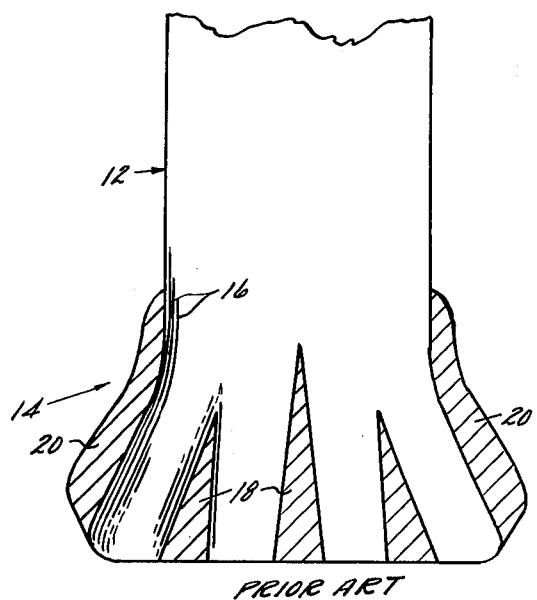
FIG. 2 is an enlarged schematic view of a prior art composite blade dovetail.

Referring now to FIG. 2, there is depicted therein a typical prior art composite blade dovetail 14. Filament laminates 16 embedded in a matrix are splayed and bonded together in essentially parallel relationship to each other to form the airfoil portion 12 of blade 10. To form the dovetail retaining profile, predetermined of the filament laminates are splayed at their radially inner extremity forming wedge-shaped voids therebetween, and herein numbering three. Typically, the voids are filled with a dense, homogeneous material such as titanium or stainless steel in the form of wedges 18 to provide a load-bearing structure. Metallic outserts 20 of the same material as insert wedges 18 may be provided to partially surround the dovetail at the dovetail/rotatable hub interface to provide filament laminate protection and to effect a more uniform load transfer from the disc to the airfoil. As previously discussed, there are numerous inherent shortcomings common to such dovetails.

Figure 3:
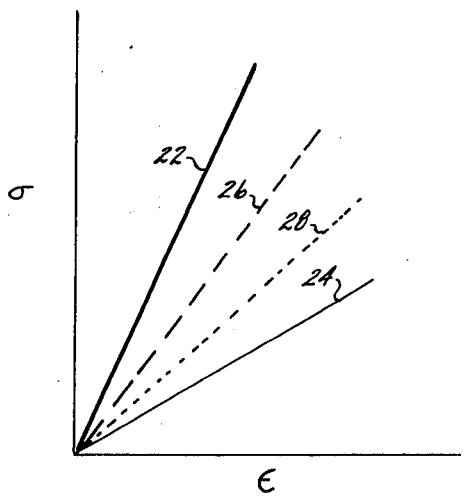
FIG. 3 graphically depicts the effect of incorporating the transition material of the subject invention into a representative composite dovetail.

The very nature of composite materials is that they exhibit anisotropy (i.e., having different properties in different directions). To overcome this anisotropic behavior, a transition is needed to change from the high modulus composite material to the relatively lower modulus homogeneous metallic insert and outsert material such as titanium, stainless steel, nickel and others well known in the art. In essence, a gradient or transition material will provide for a more uniform distribution of imposed stresses. Referring to FIG. 3 there is graphically depicted a typical stress ($\sigma$) versus strain ($\epsilon$) coordinate system. The locus of points represented by line 22 depicts the loading of a typical composite filament laminate structure such as laminate 16 (FIG. 2). The slope of the curve ($d\sigma/d\epsilon$) is defined as its modulus of elasticity. Similarly, the locus of points represented as line 24 depicts the loading of the homogeneous metallic insert material. Clearly, at any value of strain, a relatively large stress differential exists between the insert material and the composite material. In order to provide for a more uniform distribution of the load and to provide for transition from the composite to the homogeneous metallic insert materials, a transition material is provided having graded properties. Preferably, the transition material would have properties similar to that of the material to which it is adjacent. In other words, the transition material would exhibit a modulus of elasticity represented as dashed line 26, FIG. 3, proximate the composite material and a modulus such as that of dotted line 28 proximate the homogeneous metallic material.

As an example, where the composite material comprises a metallic composite of boron filaments in an aluminum matrix and the homogeneous insert material comprises stainless steel, a transition material comprising a stainless steel wire mesh in an aluminum matrix could be employed. The mesh preferably would be layered (two layers to be consistent with FIG. 3) with the layer adjacent to the composite filament material having a higher volume percent of aluminum matrix than that adjacent the stainless steel inserts. This would facilitate the bonding process. Clearly, the number of mesh layers could be as few as one and as many as necessary to obtain the desired gradient. Thus, the "transition zone" can be either a constant volume percent of stainless steel mesh/aluminum or can be a gradient from a low volume percent (adjacent the boron/aluminum composite) to a high volume percent (adjacent the hard, load-bearing homogeneous metallic material). FIG. 3 is merely meant to demonstrate the concept and is not meant to be limiting in any respect.

Figure 4:
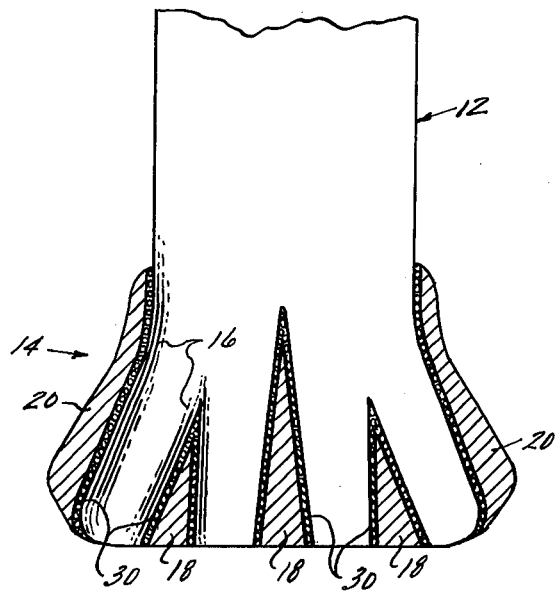
FIG. 4 is an enlarged schematic view similar to FIG. 2 of the dovetail portion of the blade of FIG. 1 and including the transition material of the present invention.

A blade dovetail incorporating the subject matter of the present invention is depicted in FIG. 4. According to the present invention, the improvement comprises the transition material 30 disposed between the filament laminates and the inserts 18, the transition material having a modulus of elasticity greater than that of the insert and less than that of the laminates. Likewise, transition material is interposed between the filament laminates 16 and outserts 20.

Transition material having as an additional characteristic a coefficient of expansion intermediate that of the filament laminates and the homogeneous inserts would develop lower thermal stresses at the interfaces of the constituent materials. Thus, such a material would increase the dovetail load-carrying capability and prolong its life.

It will be obvious to one skilled in the art that certain changes can be made to the above-described invention without departing from the broad inventive concepts thereof. For example, the invention is not limited in application to metallic composite articles such as boron/aluminum. The same approach could also be incorporated with the inserts and outserts of an epoxy/graphite composite blade, or a blade comprising any fiber embedded in any binder such as an organic resin, for its structure. In such an embodiment, the matrix of the mesh transition material would comprise the binder of the composite filament laminates. Additionally, the present invention is not limited in application to turbomachinery blades, but is applicable to any article subjected to high loading in operation which comprises at least two materials of significantly different moduli of elasticity. It is intended that the appended claims cover these and all other variations of the present invention's broader inventive concepts.

Having thus described the invention, what is considered novel and desired to be secured by Letters Patent of the United States is:

1. In a blade comprising an airfoil and dovetail including a plurality of bonded filament laminates comprising elongated filaments embedded in a matrix material, the laminates being splayed at a location along their length and receiving a metallic insert for bonding therebetween, the improvement comprising a transition material comprising a wire mesh embedded in the same matrix material, bonded along substantially the entire interface between the filament laminates and the insert, said transition material having a modulus of elasticity greater than that of the insert and less than that of the laminates.

2. The improved blade as recited in claim 1 wherein the transition material comprises a constant volume percent of wire mesh.

3. The improved blade as recited in claim 1 wherein the transition material includes a gradient of volume percent of wire mesh, wherein the highest volume percent of wire mesh is proximate the metallic element.

4. The improved blade as recited in claim 1 wherein the transition material comprises a stainless steel wire mesh in an aluminum matrix.

5. The improved blade as recited in claim 1 wherein the transition material comprises a stainless steel wire mesh in an epoxy matrix.

* * * * *